United States Patent [19]

Briggs

[11] 3,824,839

[45] July 23, 1974

[54] LEAK DETECTING SYSTEM AND METHOD FOR PASSING A MEASURED SAMPLE OF GAS TO A LEAK DETECTOR

[75] Inventor: Walton Ellis Briggs, Lynnfield, Mass.

[73] Assignee: Varian Associates, Palo Alto, Calif.

[22] Filed: Aug. 3, 1973

[21] Appl. No.: 385,622

Related U.S. Application Data

[63] Continuation of Ser. No. 183,495, Sept. 24, 1971, abandoned.

[52] U.S. Cl. ............................................. 73/40.7
[51] Int. Cl. ........................................ G01m 3/04
[58] Field of Search ............... 73/38, 40, 40.7, 49.2, 73/49.3

[56] References Cited
UNITED STATES PATENTS
3,416,359  12/1968  Durbin et al.......................... 73/40.7

Primary Examiner—Donald O. Woodiel
Attorney, Agent, or Firm—Stanley Z. Cole; Leon F. Herbert; John J. Morrissey

[57] ABSTRACT

A leak detecting system has two valves in line between the test piece and the leak detector to provide a fixed volume of gas between the valves. The valve nearest the sample is opened while the valve nearest the leak detector is closed. If the test piece has a leak, a measured quantity of the test gas leaking through the test piece will be collected in said fixed volume. Then the valve nearest the test piece is closed and the valve nearest the leak detector is opened to conduct the measured volume of gas to the detector. Additional valve means are employed to provide a plurality of different size fixed volumes. In which case, the valves are operated to conduct the fixed volumes of gas to the leak detector in sequence starting with the smallest volume and proceeding to the next larger volume until a leak is signaled by the leak detector.

21 Claims, 4 Drawing Figures

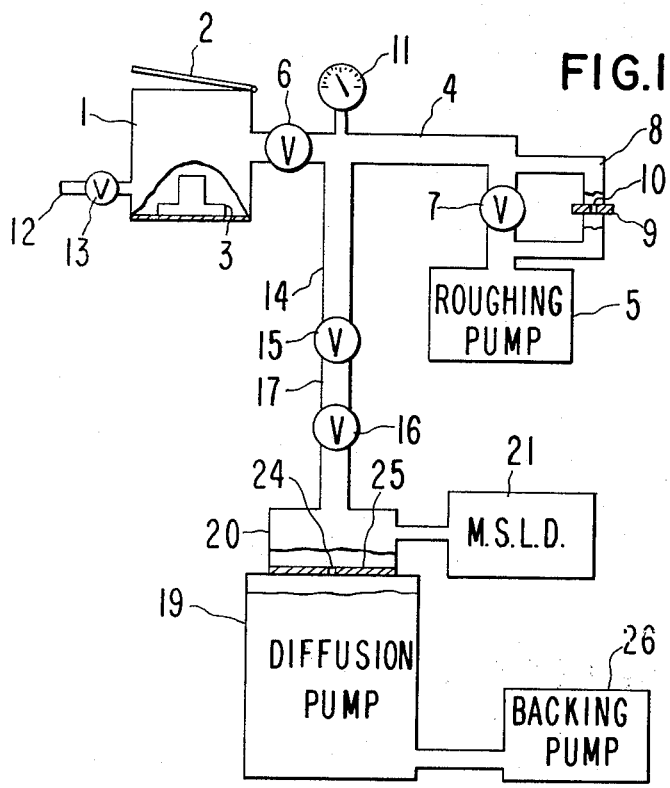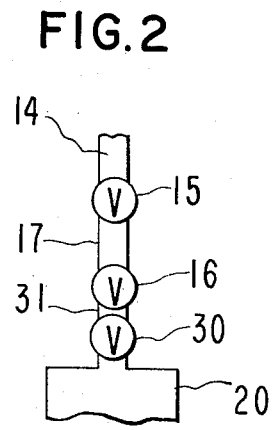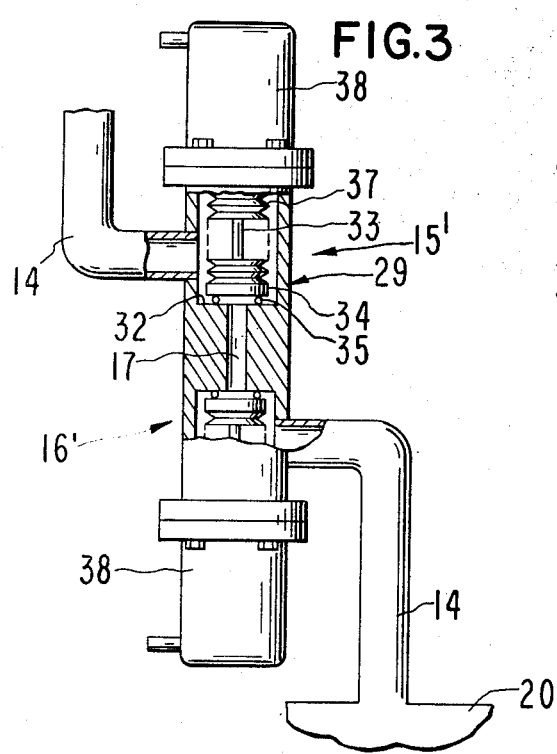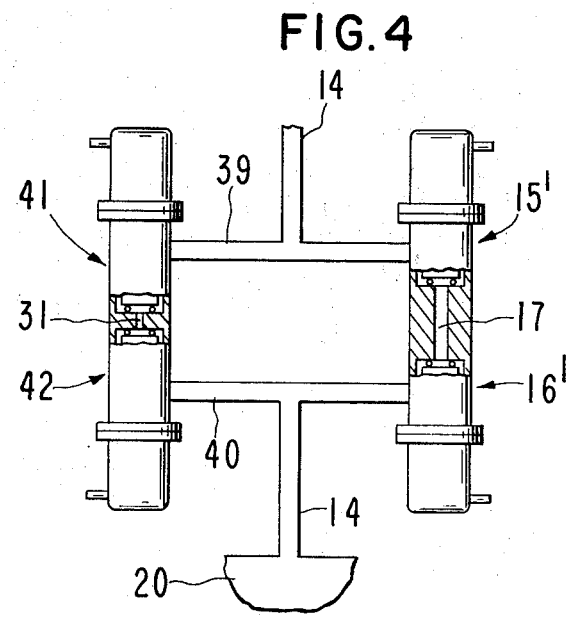

LEAK DETECTING SYSTEM AND METHOD FOR PASSING A MEASURED SAMPLE OF GAS TO A LEAK DETECTOR

This is a continuation of application Ser. No. 183,495 filed Sept. 24, 1971.

BACKGROUND OF THE INVENTION

1. Field of the Invention

This invention is an improvement in the field of detecting leaks in test pieces.

2. Description of the Prior Art

In the field of leak testing it is customary to expose one side of a test piece to a test gas, usually helium, and create a vacuum in a conduit on the other side of the test piece. It is also customary to then expose the vacuum conduit to a leak detector which is designed to give a signal indicative of the amount of helium present. An early process was to pump the vacuum conduit for sufficient time to create a very low pressure therein. The very low pressure is required because the leak detector is necessarily very sensitive and cannot be exposed to any appreciable pressure. After a sufficiently low pressure had been obtained in the vacuum conduit the leak detector was connected to the conduit. The leak detector gave an initial high signal indicative of the normal partial pressure of helium in air present in the conduit plus the helium leaking through the test piece. Then as the conduit was continually pumped to remove air the signal dropped and then rose again to indicate the equilibrium pressure of the leaking helium. This was found to be a relatively unreliable and time consuming process.

An improved prior approach which has been used is to momentarily sample gas in the vacuum conduit through a small orifice between the vacuum conduit and the leak detector. However even this approach is not completely satisfactory. One reason is that the flow rate through the orifice is extremely critical and is subject to variation due to dirt in the orifice. In addition, it was necessary to operate a valve between the orifice and the vacuum conduit so that the gas sample presented to the leak detector was chosen in the same way for each test. This meant that the valve had to be opened for each test at exactly the same time after pumping started and then closed at an exact time interval after opening. The exact timing of the valve operation is also critical and is another source of problems.

SUMMARY OF THE INVENTION

The present invention obviates problems associated with the prior approaches by collecting a measured sample volume of gas from the vacuum conduit and then introducing only that volume of gas into the leak detector. In one embodiment of the gas sample is collected by placing two valves in series between the vacuum conduit and the leak detector. The valve nearest the vacuum conduit is opened while the other valve is closed to fill the chamber formed between these valves. Then the valve nearest the vacuum conduit is closed and the valve nearest the leak detector is opened to communicate the measured charge of gas to the leak detector. In a second aspect of the invention valves are arranged to provide two measured volumes for collecting the gas in the vacuum conduit. The smaller of the two measured volumes is first introduced into the leak detector so that if a gross leak is present or if the test piece ruptured, the leak detector will not be subjected to high pressure of the test gas. If no leak occurs, the larger of the sample volumes is then introduced into the leak detector. The two volume approach is also useful to sort test pieces, for example, those which show a minor acceptable leak from the small sample volume are classified as lower acceptable grade, and those which show no leak from the small sample and show a leak within acceptable limits from the larger sample volume are classified as a higher grade. Those which show no leak from the larger sample are of course classified as highest grade.

BRIEF DESCRIPTION OF THE DRAWINGS

FIG. 1 is a diagrammatic view of a leak detecting system according to the invention with portions shown in section. This embodiment shows a single measured volume between two valves;

FIG. 2 shows a modified embodiment of a portion of FIG. 1 involving two measured volumes and three valves;

FIG. 3 is an enlarged view, partly in section, showing a preferred type of valve for use in FIG. 1; and FIG. 4 is a view on reduced scale, partly in section, showing an arrangement for using the preferred type of valve in connection with an embodiment involving two measured collection chambers.

DESCRIPTION OF THE PREFERRED EMBODIMENT

As shown in FIG. 1 the improved leak detecting system comprises a test chamber 1 having a hinged door 2 so that a test piece 3 may be inserted into the chamber. The chamber is designed so that when the door 2 is closed a hermetically sealed envelope is formed around the test piece 3. A vacuum conduit 4 is connected from the test chamber 1 to the inlet of a conventional mechanical rough pump 5. A conventional vacuum valve 6 is positioned at the left of conduit 4 to be able to open or close the test chamber from the conduit. A conventional valve 7 is positioned in the conduit 4 adjacent the rough pump to be able to open or close the communication between the rough pump and the conduit. A bypass conduit 8 is positioned around valve 7 and contains a partition 9 having a small orifice 10. The size of orifice 10 is preferably made adjustable as in the form of a conventional needle valve (not shown). A conventional vacuum gauge 11 is connected to the vacuum conduit 4 between valves 6 and 7. An air admitting conduit 12 is connected to the chamber 1, and a conventional valve 13 is located in conduit 12. Conduit 12 is provided so that after a test, valve 13 can be opened to permit fresh air to enter chamber 1. This removes the vacuum in chamber 1 and permits door 2 to be easily opened. The fresh air also displaces test gas which may have leaked out of test piece 3 so that an erroneous reading will not be given for the next test piece.

An additional vacuum conduit 14 is connected to the vacuum conduit 4 between valves 6 and 7. Valves 15 and 16 are connected in series along conduit 14. Valves 15 and 16 can be conventional vacuum valves. The fixed sample volume of the invention is formed by the conduit length 17 between the seats of valves 15 and 16. The lower end of conduit 14 is connected to a conventional diffusion pump 19. In order to increase the volume into which the sample volume 17 expands for detection by a leak detector, an enlarged chamber 20 forms the lower end of conduit 14. A mass spectrometer leak detector 21 is connected to chamber 20. Chamber 20 is connected to the inlet side of the diffusion pump through an orifice 24 in a partition wall 25. A conventional mechanical backing pump 26 is connected to the outlet end of the diffusion pump.

It will be understood that a large manifold volume is created by a conduit 14 below valve 16, including the chamber 20 and the interior of the leak detector 21 including its connection to chamber 20. This manifold volume is substantially larger than the volume of sample chamber 17. The critical relation is that when the sample volume 17 is released into said large manifold volume the resulting pressure in the large manifold volume, and therefore in leak detector 21, must not exceed $10^{-4}$ Torr because a higher pressure would damage the leak detector. In one practical design, chamber 17 has a volume of 1 cubic centimeter and the manifold has a volume of 1 liter.

Regardless of the type of system which is employed for detecting leaks there are two basic ways of connecting the test piece to the system. Each of these ways involves exposing one side of the test piece to a test gas and pumping gas from the other side of the test piece to create a low pressure zone into which the test gas will pass through a leak in the test piece and thence into the leak detecting system. One of the ways to achieve the pressure differential across the test piece is to charge the inside of the test piece with test gas. This can be done during manufacture of the test piece. Alternatively, after the test piece is manufactured it can be placed in a chamber and exposed to test gas under high pressure. If there are any leaks in the test piece, the gas will pass to the inside of the test piece. After the test piece has been charged by either of these methods it is placed in the test chamber, such as chamber 1 in FIG. 1. When low pressure is created in test chamber 1, test gas inside the test piece will pass into the chamber if there is any leak in the test piece. This approach for creating pressure differential across the test piece is, of course, applicable only to items which are completely enclosed to form a hermetically sealed envelope.

Another approach is used for test pieces which do not form a complete sealed envelope, such as items having an envelope with a hole in the wall thereof, or planar items such as the tops of drink containers. In the case of items having an opening in the wall thereof, the open wall of the item is sealingly connected to the left end of vacuum conduit 4, instead of connecting the conduit to test chamber 1. Similarly planar pieces such as can tops are sealingly held against the left end of vacuum conduit 4. The test procedure is the same as described in connection with test chamber 1 except that during the time when gas is pumped out of the vacuum conduit 4 the left or outer side of the test piece is exposed to test gas. The exposure can be accomplished either by flowing test gas around the outside of the test piece or enclosing the outside of the test piece with a cover and introducing the test gas into the space between the cover and the outside of the test piece. Obviously the leak detecting system and the method described herein are applicable to both of the described methods for obtaining pressure differential across the test piece.

The test gas preferred for most leak detecting systems including the present invention is helium. For maximum sensitivity, substantially pure helium is used. However, for most situations the helium may be mixed with air in a known percentage by volume. When helium is used as the test gas the mass spectrometer leak detector 20 is of course designed to detect only helium ions. A suitable mass spectrometer leak detector is disclosed in U.S. Pat. No. 3,277,295 issued Oct. 4, 1966 to the same inventor as the present invention.

The apparatus disclosed in FIG. 1 operates as follows: In the ready-to-test state, valves 6 and 16 are closed, and valves 15 and 7 are open to remove helium from the previous test out of conduits 4 and 14 and sample chamber 17 via pump 5. Any helium in the system below valve 16 is of course removed by pump 19. Then valve 13 is opened to admit air at atmospheric pressure to chamber 1, and then door 2 is opened. In cases of particularly sensitive testing it is desirable to pump fresh (substantially helium-free) air through conduit 12 to purge chamber 1 of any helium remaining from the previous test.

The test cycle is as follows: Test part 3 (prepressurized with helium) is placed in chamber 1 and door 2 is closed. Valve 13 is closed and then valve 6 is opened. Pump 5 creates a predetermined vacuum in chamber 1 as indicated on gauge 11. Typically this pressure is selected to be about 0.1 Torr. Then valve 7 is closed so that the intake to pump 5 will be through orifice 10. Orifice 10 is of a fixed size, or if adjustable is adjusted to a size, for permitting the flow necessary to maintain the constant predetermined vaccuum in chamber 1. Next valve 15 is closed to trap a gas sample in chamber 17. Depending on the type of test piece and conditions set for the tests, a short dwell period can be selected for the time between closing of valve 7 and closing of valve 15, typically a period between 0 and 10 seconds. After valve 15 is closed, valve 6 is closed and then valves 7 and 13 are opened to prepare the apparatus for removal of the test piece and insertion of the next test piece. Also after valve 15 is closed, valve 16 is opened to admit the gas sample in chamber 17 to the leak detector 21. Then valve 16 is closed and valve 15 is opened. At this point the apparatus is again in the ready-to-test state. It will be understood that the apparatus can be operated manually or the entire sequence of operation can be automated.

When the test gas sample of chamber 17 is admitted to the leak detector 21, the detector will signal the amount of helium present in the gas sample. Preferably, the leak detector is designed to indicate a pass or fail condition such as by lighting a green or red light, respectively. As previously stated, the maximum pressure condition in the leak detector is controlled by the small size of sample volume 17 as compared to the large manifold volume between valve 16 and orifice 24, including the volume of detector 21. However, it is desirable to reduce the pressure in the leak detector quickly after the detector has reacted to the introduction of gas from the sample volume 17. Accordingly orifice 24 is of fixed size, or if adjustable is adjusted to a size, which will permit the leak detector to be exposed to substantially the full pressure effect of the release of the sample volume at the instant after the sample volume is released and then quickly be exposed to a reduced pressure. In a preferred embodiment the pressure in the leak detector will be $10^{-5}$ Torr before release of the sample volume, will go to $10^{-4}$ Torr instantaneously after release, and then will go immediately back to $10^{-5}$ Torr.

An important aspect of the invention involves the realization that with some types of test pieces the possible difference in leak rate is so great that even with a fixed sample chamber 17, it is difficult to detect a small leak and at the same time not contaminate the leak detector with an excessive partial pressure of helium in the event of a gross leak. It has been found that this problem can be solved by providing a plurality of sample volumes of different size, as will now be described in detail.

FIG. 2 shows a modified embodiment of FIG. 1 in which an additional valve 30 is placed in the vacuum conduit 14 to provide an additional sample chamber 31 between the valves 16 and 30. As in the case of valves 15 and 16, valve 30 can be a conventional vacuum valve. The process for using the embodiment of FIG. 2 is similar to that of FIG. 1. More specifically, valve 30 is closed while valves 15 and 16 are open so that low pressure gas in chamber 1 will fill the sample chambers 17 and 31. After the chambers 17 and 31 are charged, valves 15 and 16 are both closed to trap the charges. Then valve 30 is opened to conduct the charge in volume 31 to the leak detector. If the small amount of gas in chamber 31 does not register any leak, then valve 16 is opened to conduct the larger sample charge in chamber 17 to the leak detector. Thus if there is a gross leak or rupture, the small volume of gas in chamber 31 will contain enough helium for the leak detector to detect without exposing the leak detector to an excessive amount of helium. If the test piece has a sufficiently fine leak or no leak at all, the leak detector will give no indiciation of a leak when valve 30 is opened. It is then safe to open valve 16 and conduct the larger volume of gas in chamber 17 to the leak detector.

In a preferred embodiment, the large sample chamber 17 is 100 to 1,000 times larger than the small sample chamber 31, and the large chamber 17 is the same size as the single chamber 17 in FIG. 1.

FIG. 3 discloses a preferred type of specific valve for use in connection with the single sample arrangement of FIG. 1. More specifically, the valve structure comprises a double ended body 29 having an intermediate partition wall 32. Wall 32 has a bore therethrough which forms the sample chamber 17. A valve chamber is formed on each side of the wall 32 and each chamber contains a valve stem 33 having a valve head 34 carrying an O-ring seal 35. The valve arrangement in the lower half of valve body 29 is identical to the arrangement in the upper half. Obviously when the valve stems 33 move toward their respective side of the wall 32, the O-rings 35 will be pressed against the wall to close the respective end of passage 17. Conversely when the stems 33 are moved away from wall 32, the respective ends of passage 17 will be opened. Each of the valve rods 33 is surrounded by a hermetically sealed bellows 37 as is customary in vacuum valve construction. A conventional screw and handle mechanism can be provided for moving the valve stem 33 inwardly and outwardly in the valve chambers. However, it is preferred to provide automatic operation in the form of conventional cylinder and piston drives 38. The upper half of valve body 29 forms a valve 15' corresponding in function to the valve 15 in FIG. 1. Similarly the lower half of the valve body in FIG. 3 forms a valve 16' corresponding in function to the valve 16 in FIG. 1.

FIG. 4 discloses an arrangement for providing two sample chambers 17 and 31 using valves of the type shown in FIG. 3. More specifically, valves 15' and 16' are connected to conduit 39 and 40 which are connected along the conduit 14 of FIG. 1. In FIG. 4, the single valve 30 in FIG. 2 is replaced by two valves 41 and 42. All of the valves in FIG. 4 are identical to the valve structure described in connection with FIG. 3 except that the conduits connected to the valves are located on the same side of the valve body instead of on opposite sides of the valve body as shown in FIG. 3. In operation of the arrangement of FIG. 4, valves 16' and 42 are closed while valves 15' and 41 are open to fill the sample chambers 17 and 31. Then valves 15' and 41 are closed to trap the samples in chambers 17 and 31. Next valve 42 is opened to conduct the sample in volume 31 to the leak detector. If no leak is detected, then valve 16' is opened to conduct the larger sample in volume 17 to the leak detector.

What is claimed is:

1. Leak detecting apparatus comprising a first vacuum pump, first conduit means for connecting said first pump to one side of a test piece, a second vacuum pump, second conduit means connecting said second pump to said first conduit means, at least two valves in said second conduit means, said valves confining between them when closed at least one fixed volume of gas, and a leak detector connected to said second conduit means at a position between said valves and said second pump, said at least two valves comprise a hollow valve body having a partition therein forming a valve chamber on each side of said partition, said partition having a bore therethrough which forms said at least one fixed volume, a valve head in each of said valve chambers to open and close the respective adjacent end of said bore, one portion of said second conduit means being connected to one of said valve chambers, and another portion of said second conduit means being connected to the other of said valve chambers.

2. A leak detecting method comprising the steps of exposing one side of a test piece to a test gas, pumping gas from the other side of said test piece to create a low pressure gas zone into which said test gas will pass through a leak in said test piece, collecting a fixed volume of gas in said low pressure zone including any test gas which may leak through said test piece, and then communicating said fixed volume of gas to a leak detector through substantially unrestricted passage while preventing additional gas from entering said fixed volume, whereby said detector will be quickly exposed to a known fixed volume of gas.

3. A leak detecting method as claimed in claim 2 comprising collecting a second fixed volume of gas in said low pressure zone, said second fixed volume being larger than the first-mentioned fixed volume; and if said leak detector does not indicate a leak after communication with said first-mentioned fixed volume, then communicating said larger fixed volume to said leak detector while preventing additional gas from entering said larger fixed volume.

4. A leak detecting method as claimed in claim 2 in which said fixed volume of gas is collected at a preselected pressure.

5. A leak detecting method as claimed in claim 4 in which said fixed volume is expanded into said leak detector and gas is pumped out of said leak detector before and during said expansion, and said preselected pressure and fixed volume and expansion and pumping are selected so that the expanded pressure in the leak detector does not exceed $10^{-4}$ Torr.

6. The method of operating a leak detection system comprising a conduit having an inlet to receive test gas which leaks through a test piece, a leak detector connected to said conduit at a location spaced from said inlet, valve means in said conduit between said inlet and said leak detector, said valve means forming when closed a large fixed volume and a small fixed volume; said method comprising operating said valve means to permit test gas which may leak through the test piece to be collected and trapped in said small fixed volume, operating said valve means to transfer gas in said small fixed volume to said leak detector while preventing additional gas from entering said small fixed volume, operating said valve means to permit test gas which may leak through the test piece to be collected and trapped in said large fixed volume; and if said leak detector did not indicate a leak when exposed to said small fixed volume, then operating said valve means to transfer gas in said large fixed volume to said leak detector while preventing additional gas from entering said large fixed volume.

7. The method as claimed in claim 6 in which said valve means comprise first, second and third valves in series along said conduit, said first valve being positioned toward said inlet, said second valve being positioned between said first valve and said leak detector, said third valve being positioned between said second valve and said leak detector, said small fixed volume being formed between said second and third valves, and said large fixed volume being formed between said first and second valves; said method of operating said valves comprising closing said third valve, opening said first and second valves to admit to said fixed volumes test gas which may leak through the test piece, closing said first and second valves to trap gas in said fixed volumes, opening said third valve to transfer only said small fixed volume to said leak detector; and if said leak detector does not indicate a leak when exposed to said small fixed volume, then opening said second valve to transfer only said large fixed volume to said leak detector.

8. The method as claimed in claim 6 in which said valve means comprise first and second valves in series with each other, third and fourth valves in series with each other and in parallel with said first and second valves, said first valve being positioned toward said inlet, said second valve being positioned between said first valve and said leak detector, said third valve being positioned toward said inlet, said fourth valve being positioned between said third valve and said leak detector, said small fixed volume being formed between said first and second valves, and said large fixed volume being formed between said third and fourth valves; said method of operating said valves comprising closing said second and fourth valves to admit to said fixed volume test gas which may leak through the test piece, closing said first and third valves to trap gas in said fixed volumes, opening said second valve to transfer only said small fixed volume to said leak detector; and if said leak detector does not indicate a leak when exposed to said small fixed volume, then opening said fourth valve to transfer only said large fixed volume to said leak detector.

9. Leak detecting apparatus comprising conduit means having an opening to receive a test gas which may leak through a test piece, a pump having an inlet connected to said conduit means downstream of said opening, a first valve in said conduit means between said opening and said pump, a second valve in said conduit means in series between said first valve and said pump, said first and second valves having a closed position confining between them when closed a fixed volume portion along said conduit means, means forming a restricted orifice in said conduit means in series between said second valve and said pump, and a leak detector in communication with said conduit means between said second valve and said restricted orifice, said first and second valves being operable to confine between them said fixed volume portion of test gas and then communicate only said fixed volume to said leak detector.

10. Leak detecting apparatus as claimed in claim 9 further comprising valve means forming when closed a second fixed volume portion along said conduit means, said second fixed volume portion being smaller than the first-mentioned fixed volume portion, and said valves and valve means being operable to form both of said fixed volume portions and then communicate first said smaller fixed volume and then the larger fixed volume to said leak detector.

11. Leak detecting apparatus as claimed in claim 9 further comprising a second pump, second conduit means having one end connected to the inlet of said second pump, the other end of said second conduit means being connected to the first-mentioned conduit means upstream of said first valve and downstream of said opening in said first mentioned conduit means, and a valve in said first-mentioned conduit means upstream of said first valve and upstream of the connection of said second conduit means to said first-mentioned conduit means.

12. Leak detecting apparatus comprising conduit means having an inlet to receive test gas which may leak through a test piece, a leak detector connected to said conduit means at a location spaced from said inlet, first and second valves in series with each other along said conduit means between said inlet and said leak detector, third and fourth valves along said conduit means between said inlet and said leak detector, said third and fourth valves being in series with each other and in parallel with said first and second valves, said first and second valves confining a fixed volume between them when closed, said third and fourth valves confining between them when closed a fixed volume which is larger then the first-mentioned fixed volume, and said valves being operable to trap gas in said fixed volumes and then transfer only said fixed volumes of gas in sequence to said leak detector starting with the smaller fixed volume.

13. Leak detecting apparatus comprising conduit means having an inlet to receive test gas which leaks through a test piece, a leak detector connected to said conduit means at a location spaced from said inlet, two valves in series along said conduit means between said inlet and said leak detector, said valves forming between them when closed a fixed volume in said conduit means, said conduit means having immovable walls everywhere along the portion forming said fixed volume between said valves, both said valves being fully closable, and the valve which is nearest said leak detector being quickly operable between fully open and fully closed position to provide a substantially instantaneous full communication between said fixed volume and said leak detector.

14. Leak detecting apparatus as claimed in claim 13 further comprising vacuum pumping means for evacuating said conduit means on its inlet side of the one of said valves which is nearest said leak detector, said pumping means being adapted to perform said evacuation when said one valve is in closed position.

15. A leak detection method comprising the steps of presenting a test gas atmosphere to one side of a test piece, and exposing the other side of said test piece to an evacuable test zone, connecting a vacuum pump to said test zone while said other side of said test piece is in communication with said test zone to create a low pressure gas region into which said test gas will pass through a leak in said test piece, then collecting a fixed volume of gas in said low pressure region including any test gas which may leak through said test piece, and then communicating said fixed volume of gas to a leak detector while preventing additional gas from entering said fixed volume.

16. A leak detecting method as claimed in claim 15 in which said fixed volume of gas is communicated to said leak detector through a substantially unrestricted passage.

17. A leak detecting method as claimed in claim 15 further comprising pumping gas out of said leak detector, and collecting gas in said fixed volume at a preselected pressure; said preselected pressure, size of said fixed volume, and rate of pumping gas out of said leak detector be selected to create a pressure of less than $10^{-4}$ Torr in said leak detector before said fixed volume is transmitted to said detector and permit the pressure in the leak detector to increase when said fixed volume of gas at said preselected pressure is transmitted to the leak detector, and said increased pressure being a pressure of less than $10^{-3}$ Torr.

18. Leak detecting apparatus comprising conduit means having an inlet to receive test gas which may leak through a test piece; a leak detector connected to said conduit means at a location spaced from said inlet; first, second, and third valves connected in that order in series with each other along said conduit means between said inlet and said leak detector, with said first valve being nearest said inlet; said second and third valves confining a first fixed volume between them when closed; said first and second valves confining between them when closed a second fixed volume which is larger than said first fixed volume; vacuum pump means connected to said apparatus for evacuating said conduit means on the leak detector side of said third valve even when said third valve is closed and for evacuating said conduit means on the inlet side of said first valve even when said first valve is closed, and a fourth valve in series between said first valve and said pump means for evacuating the inlet side of said first valve.

19. Leak detecting apparatus comprising conduit means having an inlet to receive test gas which may leak through a test piece, a leak detector communicating with said conduit means at a location spaced from said inlet, means along said conduit means for collecting two different size fixed volumes of gas received from said inlet and for transmitting only the smaller of said fixed volumes of gas to said leak detector and then transmitting only the larger of said fixed volumes to said leak detector, vacuum pump means for evacuating said conduit means from the inlet side of said collecting means and from the leak detector side of said collecting means, pressure indicating means communicating with said conduit means to permit collecting said fixed volumes of gas at a preselected pressure, and valve means between the inlet side of said collecting means and said pump means for evacuating the conduit means on the inlet side of said collecting means.

20. Leak detecting apparatus as claimed in claim 19 in which said leak detector is a mass spectrometer leak detector.

21. Leak detecting apparatus as claimed in claim 19 in which said valve means comprises a valve and a restricted orifice by-pass around said valve.

* * * * *